US011089581B2

United States Patent
Åström et al.

(10) Patent No.: US 11,089,581 B2
(45) Date of Patent: Aug. 10, 2021

(54) SIGNALING DOWNLINK CONTROL INFORMATION IN A WIRELESS COMMUNICATION NETWORK

(71) Applicant: Telefonaktiebolaget LM Ericsson (publ), Stockholm (SE)

(72) Inventors: Magnus Åström, Lund (SE); Peter Alriksson, Hörby (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 113 days.

(21) Appl. No.: 15/776,107

(22) PCT Filed: Mar. 23, 2018

(86) PCT No.: PCT/EP2018/057528
§ 371 (c)(1),
(2) Date: May 15, 2018

(87) PCT Pub. No.: WO2018/184875
PCT Pub. Date: Oct. 11, 2018

(65) Prior Publication Data
US 2020/0084752 A1    Mar. 12, 2020

Related U.S. Application Data

(60) Provisional application No. 62/480,849, filed on Apr. 3, 2017.

(51) Int. Cl.
*H04W 72/04* (2009.01)
*H04L 1/16* (2006.01)
*H04W 56/00* (2009.01)

(52) U.S. Cl.
CPC ........ *H04W 72/042* (2013.01); *H04L 1/1614* (2013.01); *H04W 56/001* (2013.01); *H04W 72/048* (2013.01); *H04W 72/0446* (2013.01)

(58) Field of Classification Search
CPC combination set(s) only.
See application file for complete search history.

(56) References Cited

U.S. PATENT DOCUMENTS

2015/0200741 A1* 7/2015 Liu ................. H04L 5/0053
370/312
2016/0029239 A1* 1/2016 Sadeghi ............ H04W 24/10
370/252

(Continued)

FOREIGN PATENT DOCUMENTS

EP     2894915 A1    7/2015

OTHER PUBLICATIONS

3GPP747, Apr. 2017, (Resource sharing between DL data and control channels—R1-1705747).*

(Continued)

*Primary Examiner* — Lakeram Jangbahadur
(74) *Attorney, Agent, or Firm* — Coats & Bennett, PLLC

(57) ABSTRACT

A wireless device is configured with or allocated two or more control resource sets for receiving downlink control information from a base station or cell. The two or more control resource sets correspond to two or more possible states of a time slot used for downlink transmission. The wireless device determines the state of a time slot and selects one or the two or more control channel resource sets to monitor for DCI depending on the state of the time slot. In one exemplary embodiment, the time slot has two possible states and the state of the time slot is determined by the presence or absence of an SS block.

29 Claims, 8 Drawing Sheets

(56) References Cited

U.S. PATENT DOCUMENTS

| | | | |
|---|---|---|---|
| 2018/0109344 A1* | 4/2018 | Ly | H04W 56/0085 |
| 2018/0123765 A1* | 5/2018 | Cao | H04L 1/1822 |
| 2018/0227838 A1* | 8/2018 | Hayashi | H04W 72/042 |
| 2019/0090126 A1* | 3/2019 | Hayashi | H04W 72/0446 |

OTHER PUBLICATIONS

NTT Docomo, Inc., "Resource sharing between data and control channels", Discussion and Decision, 3GPP TSG RAN WG1 Meeting #88bis, Spokane, USA, Apr. 3, 2017, pp. 1-7, R1-1705747, 3GPP.

Mediatek, Inc., "Design of Search Space", 3GPP TSG RAN WG1 Meeting #88bis, Apr. 3-7, 2017, pp. 1-6, Spokane, US, R1-1704444.

Intel Corporation, "General aspects for NR search space", 3GPP TSG RAN WG1 Meeting #88, Apr. 3-7, 2017, pp. 1-5, Spokane, US, R1-1704746.

* cited by examiner

SIGNALING DOWNLINK CONTROL INFORMATION IN A WIRELESS COMMUNICATION NETWORK

TECHNICAL FIELD

The present disclosure relates generally to downlink transmissions in wireless communication networks and, more particularly, to methods of transmitting and receiving downlink control information.

BACKGROUND

Currently the 5th Generation (5G) of cellular systems, sometimes referred to as Next Radio (NR), is being standardized by the Third Generation Partnership Project (3GPP). NR is developed for maximum flexibility to support multiple and substantially different use cases. In addition to typical mobile broadband (MBB) services, NR networks are designed to support Machine-Type Communications (MTC), Ultra Low Latency Critical Communications (ULLCC), side link Device-to-Device (D2D) communications, and several other use cases. NR is also expected to support carrier frequencies from sub-GHz to 100 GHz.

All these requirements put extreme challenges on the system design. One important parameter in managing such vastly different use cases is the subcarrier spacing (SCS), i.e. the distance between the sub-carriers (resource elements) in an Orthogonal Frequency Division Multiplexing (OFDM) signal. The SCS determines the sensitivity to coherence time and coherence frequency in terms of samples and subcarriers that, in turn, determines sensitivity to Doppler, and changing channel conditions. It has been determined that several SCSs should be accepted, e.g., 15 kHz, 30 kHz, 60 kHz, 120 kHz and 240 kHz. Typically, lower SCSs are used at lower carrier frequencies and higher SCSs at higher carrier frequencies. The SCS also has an impact on the symbol time length. For instance, if SCS is 15 kHz, one OFDM symbol (excl. the cyclic prefix (CP)) is $\frac{1}{15}$ kHz=66.67 μs, while an OFDM symbol with 30 kHz SCS has half the symbol time, i.e. $\frac{1}{30}$ kHz=33.33 μs. Therefore, the SCS has an impact of the symbol sample rate as well.

Synchronization in NR system is similar to the initial synchronization/cell search procedure in existing Long Term Evolution (LTE) systems. The cell transmits a Primary Synchronization Signal (PSS), giving timing information, a Secondary Synchronization Signal (SSS) giving cell/beam ID information, and Physical Broadcast Channel (PBCH) giving information for the wireless device to be able to perform a random access. The PSS, SSS, and PBCH is called a synchronization signal (SS) block in the further discussions below. The SS block may also include a Tertiary Synchronization Signal (TSS) as discussed below.

To reduce complexity of the wireless device, the SS block may be transmitted with fewer SCS alternatives. At present, the likely candidates are 30 kHz subcarrier spacing below 6 GHz, and 120 or 240 kHz subcarrier spacing above 6 GHz. Furthermore, the SS block is transmitted in slots every 10 or 20 ms. In order to reduce the cell search time, the SS block may be sent on a finite set of sync center frequencies. Hence, the SS block may not be transmitted at the system bandwidth (BW) center frequency as in LTE, but instead on one of the fixed sync center frequencies within the system bandwidth specified by a standard.

In NR, the majority of control signaling will be dedicated, though some information valid for many wireless devices may be signaled via a "common" control channel, such as the NR Physical Downlink Control Channel (PDCCH). The common PDCCH will, as in LTE, span the first few OFDM symbols in at least a subset of the time slots. The wireless devices are then configured to monitor at least a subset of the PDCCH indicating potential messages to the wireless device(s). This subset is defined as a number of control resource sets, or CORSETs for short.

A potential problem arises in time slots where the SS block is transmitted. The SS block is not transmitted in every time slot. In time slots where the SS block is transmitted, the SS block may overlap control channel resources that have been allocated to a wireless device for receiving Downlink Control Information (DCI) on the PDCCH. That is, some of the control channel resources used for transmitting DCI to the wireless device on the PDCCH in time slots where the SS block is not present, may be used instead for transmitting the SS block in time slots where the SS block is being transmitted. This means that the wireless device is not able to receive the DCI in time slots where the SS block is transmitted.

SUMMARY

The disclosure provides an efficient signaling method that enables a wireless device to receive DCI in time slots where the SS block is transmitted. In exemplary embodiments, the wireless device is configured with two or more control resource sets. In one exemplary embodiment, the wireless device is configured with or allocated a first control resource set for monitoring in time slots when the SS block is not being transmitted, and a second control resource set to use in time slots where the SS block is transmitted. Because the timing of the SS block is known to the wireless device, the wireless device is able to determine whether the SS block is present in a particular time slot and select either the first control resource set or the second control resource set to monitor for DCI depending on whether the SS block is present or not.

More generally, the wireless device may determine the state of a time slot and select either a first control resource set or a second control resource set to monitor for DCI depending on the state of the time slot. In one exemplary embodiment, the state of the time slot is determined by the presence or absence of the SS block. Those skilled in the art will appreciate, however, that the techniques described herein could be applied to recurring control information other than the SS block.

Another aspect of the disclosure involves an efficient method for signaling the control resource sets. Generally, the cell/base station sends one or more resource identifiers to the wireless device to indicate the first control channel resources, the second control channel resources, or both, to the wireless device. In one exemplary embodiment, the base station explicitly signals the first control resource set to the wireless device. The wireless device then determines the second control resource set based on a pre-determined mapping between the first control resource set and the second control resource set.

Using these techniques, the signaling of the control resource set to be monitored by the wireless device can be made efficient with fewer bits to transmit. Once the control resource set is signaled for a first slot state, a map (for instance defined by standard) may be used to determine the control resource sets to monitor in the other slot states. Thus, there is no need to explicitly signal the control resource set (which typically is a bitmap) for all states.

One aspect of the disclosure comprises methods implemented by a wireless device in a wireless communication network of receiving downlink control information. In one embodiment, the wireless device determines, based on one or more resource identifiers received from a base station, two or more control resource sets to use for receiving downlink control information from the base station. The wireless device further determines a state of a time slot monitored by the wireless device (30, 200, 400) for downlink control information. The wireless device further monitors for downlink control information in the time slot on one of the control resources sets selected based on the state of the time slot.

Another aspect of the disclosure comprises a wireless device configured to receive downlink control information. In one embodiment, the wireless device comprises an interface circuit for transmitting signals to and receiving signals from a base station in the wireless communication network, and a processing circuit. The processing circuit is configured to synchronize with a cell in the wireless communication network and determine, based on one or more resource identifiers received from a base station, two or more control resource sets to use for receiving downlink control information from the base station. The processing circuit is further configured to determine a state of a time slot monitored by the wireless device for downlink control information, and monitor for downlink control information in the time slot on one of the control resources sets selected based on the state of the time slot.

Another aspect of the disclosure comprises a wireless device configured to synchronize with a cell in the wireless communication network and determine, based on one or more resource identifiers received from a base station, two or more control resource sets to use for receiving downlink control information from the base station. The wireless device is further configured to determine a state of a time slot monitored by the wireless device for downlink control information, and monitor for downlink control information in the time slot on one of the control resources sets selected based on the state of the time slot.

Another aspect of the disclosure comprises a computer program for a wireless device having a processing circuit. The computer program comprises executable instructions that, when executed by the processing circuit in a wireless device of a wireless communication network, causes the wireless device to perform the wireless device methods described above.

Another aspect of the disclosure comprises a carrier containing a computer program as described above, wherein the carrier is one of an electronic signal, optical signal, radio signal, or computer readable storage medium.

Another aspect of the disclosure comprises a non-transitory computer-readable storage medium containing a computer program that, when executed by a processing circuit in a wireless device in a wireless communication network, causes the wireless device to perform the wireless device methods described above.

Still another aspect of the disclosure comprises methods implemented by a base station in a wireless communication network of transmitting downlink control information. In one embodiment, the base station transmits one or more resource identifiers to a wireless device. The one or more identifiers enable the wireless device to determine the two or more control resource sets to use for receiving the downlink control information. The base station further determines a state of a time slot for transmitting downlink control information to the wireless device, and transmits the downlink control information in the time slot on one of the control resource sets depending on the state of the time slot.

Another aspect of the disclosure comprises a base station configured to transmit downlink control information. In one embodiment, the base station comprises an interface circuit for transmitting signals to and receiving signals from wireless devices in the wireless communication network, and a processing circuit. The processing circuit is further configured to determine two or more control resource sets to use for transmitting downlink control information to a wireless device in a cell of the base station and to transmit one or more resource identifiers to a wireless device. The one or more identifiers enable the wireless device to determine the two or more control resource sets to use for receiving the downlink control information. The processing circuit is further configured to determine a state of a time slot for transmitting downlink control information to the wireless device, and transmit the downlink control information in the time slot on one of the control resource sets depending on the state of the time slot.

Another aspect of the disclosure comprises a base station configured to transmit downlink control information. The base station is configured to transmit one or more resource identifiers to a wireless device. The one or more identifiers enable the wireless device to determine the two or more control resource sets to use for receiving the downlink control information. The base station is further configured to determine a state of a time slot for transmitting downlink control information to the wireless device, and transmit the downlink control information in the time slot on one of the control resource sets depending on the state of the time slot.

Another aspect of the disclosure comprises a computer program for a base station having a processing circuit. The computer program comprises executable instructions that, when executed by the processing circuit in the base station of a wireless communication network, causes the base station to perform the base station methods described above.

Another aspect of the disclosure comprises a carrier containing a computer program as described above, wherein the carrier is one of an electronic signal, optical signal, radio signal, or computer readable storage medium.

Another aspect of the disclosure comprises a non-transitory computer-readable storage medium containing a computer program that, when executed by a processing circuit in a base station in a wireless communication network, causes the base station to perform the base station methods described above.

DETAILED DESCRIPTION

Figure 1:
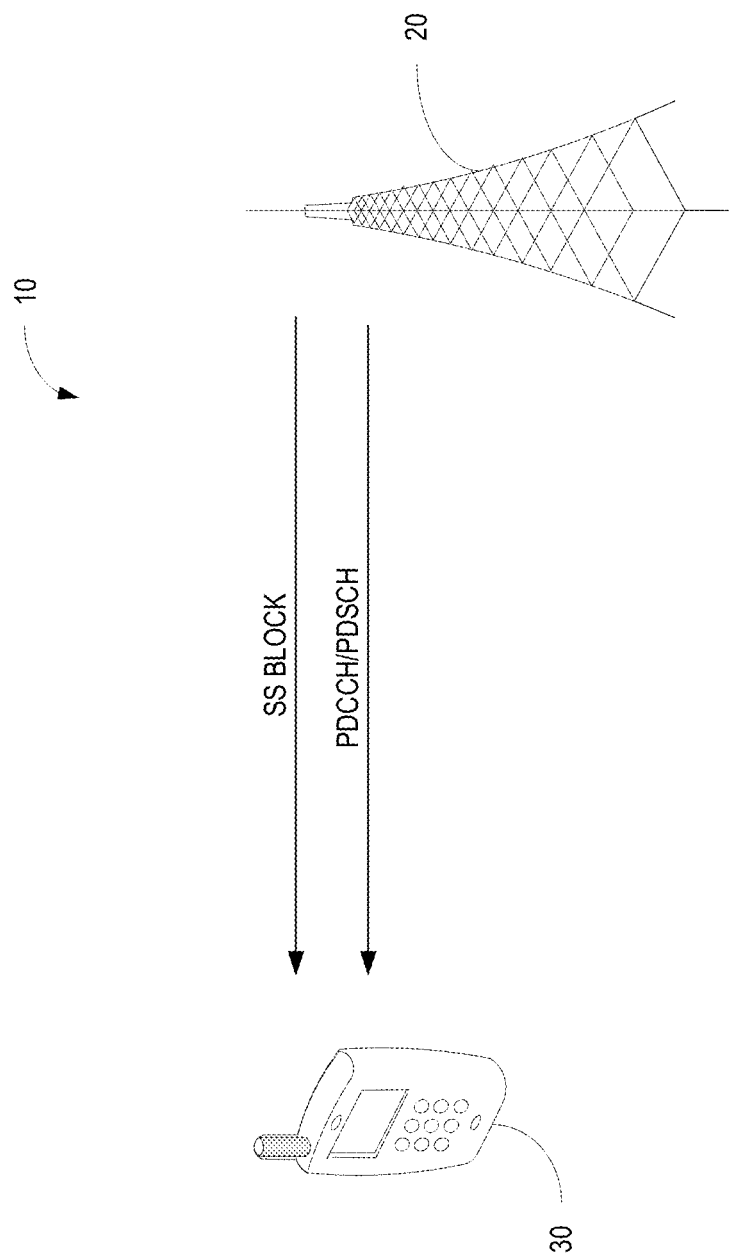
FIG. 1 illustrates communications between a base station and a wireless device in a wireless communication network.

Referring now to the drawings, an exemplary embodiment of the present invention will be described in the context of 5th Generation (5G) and Next Radio (NR) wireless communication networks currently under development by the 3rd Generation Partnership Project (3GPP). Those skilled in the art will appreciate, however, that the methods and apparatus described herein are more generally applicable to wireless communication networks that operate according to other standards, especially wireless communication networks using mixed numerology.

FIG. 1 illustrates communications between a base station 20 in a wireless communication network 10 and a wireless device 30. The base station 20 is sometimes referred to in applicable standards as an Evolved Node B (eNB) or 5G Node B (gNB). The wireless device 30, sometimes referred to as a user equipment (UE), may comprise a cellular telephone, smart phone, laptop computer, notebook computer, tablet, machine-to-machine (M2M) communication devices (also referred to as machine-type communication (MTC) devices), or other devices with wireless communication capabilities. As shown in FIG. 1, the base station 20 transmits the SS block to the wireless device 30 to enable the wireless device 30 to access the network as hereinafter described. After the wireless device establishes a connection with the base station 20 or cell, the base station 20 transmits DCI to the wireless device 30 on the PDCCH, and user data to the wireless device 30 on the PDSCH.

Similar to Long Term Evolution (LTE), 5G and NR wireless communication networks use Orthogonal Frequency Division Multiplexing (OFDM) in the downlink and OFDM or Discrete Fourier Transform (DFT) spread OFDM in the uplink. The physical resources used for communications may be viewed as a time frequency grid. Generally speaking, the time frequency grid is divided into OFDM symbols in the time domain and subcarriers in the frequency domain. Because 5G and NR networks employ mixed numerology, the duration of the OFDM symbol in the time domain and the subcarrier spacing (SCS) in the frequency domain depend on the numerology. The basic resource used for communication, referred to as a resource element, comprises one OFDM symbol in the time domain and one subcarrier in the frequency domain. In one exemplary numerology, the subcarrier spacing (SCS) is 15 kHz and the symbol duration of an OFDM symbol is 66.67 µs. In another exemplary numerology, the subcarrier spacing is 30 kHz and the OFDM symbol time is 33.33 µs.

Figure 2:
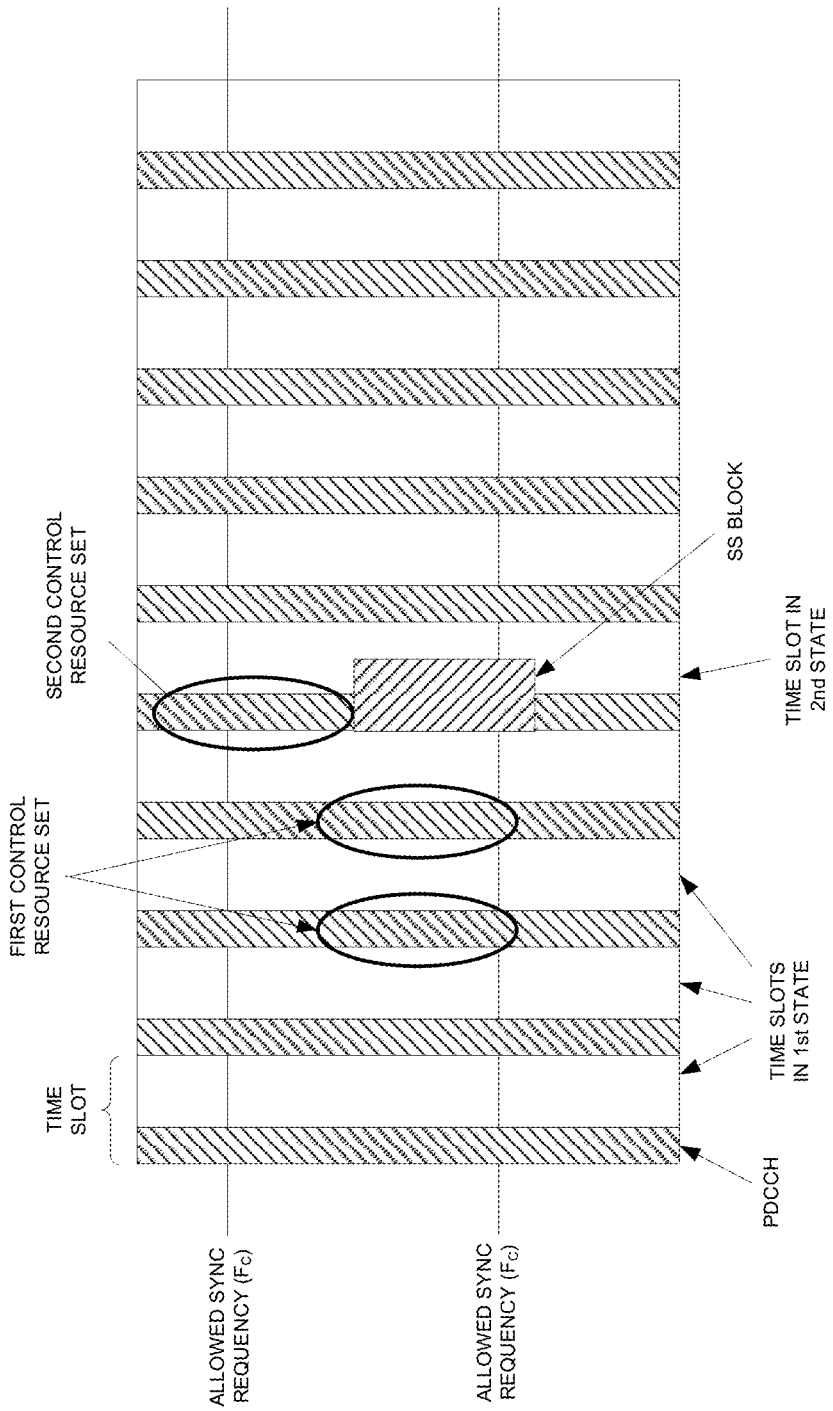
FIG. 2 illustrates an exemplary frame structure for downlink transmissions from a base station to a wireless device.

In 5G and NR systems, data is transmitted to the wireless device 30 over a downlink transport channel known as the Physical Downlink Shared Channel (PDSCH). The PDSCH is a time and frequency multiplexed channel shared by a plurality of wireless devices 30. As shown in FIG. 2, the downlink transmissions are organized into subframes. Each subframe is divided into a number of time slots, the number being dependent on the numerology used for the downlink transmission. Each time slot includes a control channel portion (shown in blue) in which a Physical Downlink Control Channel (PDCCH) is transmitted and a data portion (shown in white) in which user data is transmitted. The control region may comprise the first one or two OFDM symbols in the timeslot. For purposes of scheduling users to receive downlink transmissions, the downlink time frequency resources are allocated in units called resource blocks (RBs). Each resource block spans 12 subcarriers (which may be adjacent or distributed across the frequency spectrum).

Within a cell, the base station dynamically schedules downlink transmissions to the wireless devices 30 based on channel state information (CSI) or channel quality information (CQI) reports from the wireless device 30 transmitted on the Physical Uplink Control Channel (PUCCH) or Physical Uplink Shared Channel (PUSCH). Alternatively in TDD operation, it may use channel reciprocity for scheduling decisions. The CSI and/or CQI reports indicate the instantaneous channel condition as seen by the wireless device 30. In each time slot, the base station 20 transmits downlink control information (DCI) identifying the wireless devices 30 that have been scheduled to receive data (hereinafter the scheduled wireless devices 30) in the current time slot, and the resource blocks on which the data is being transmitted to the scheduled wireless devices 30. The DCI is typically transmitted on the PDCCH in the control region of the time slot.

In order to establish a connection with the wireless communication network 10, the wireless device 30 needs to find and acquire synchronization with a cell within the wireless communication network 10, read system parameters from a broadcast channel transmitted by the cell, and perform a random access procedure to establish a connection with the cell. The first of these steps is commonly referred to as a cell search. To assist the wireless device 30 in establishing a connection with the wireless communication network 10, the base station 20 transmits a synchronization signal block (SS) block in predetermined time slots. The SS block comprises a Primary Synchronization Signal (PSS), a Secondary Synchronization Signal (SSS), and the Physical Broadcast Channel (PBCH). In some embodiments, the SS block may further comprise a Tertiary Synchronizations Signal (TSS). The synchronization signals transmitted in each cell comprise a specific set of sequences that identify the cell. By detecting the synchronization signals, the wireless device 30 can acquire the frame timing of the cell and, by observing which of the multiple sequences the cell is transmitting, the wireless device 30 can identify the cell. Once the wireless device 30 has acquired the frame timing and the cell identity, the wireless device 30 can receive the necessary system information (SI) needed to access the cell. More particularly, the wireless device 30 can read system information in the Master Information Block (MIB) that is transmitted on the PBCH. The MIB may identify additional system information blocks (SIBs) transmitted on the PDSCH that also carry system information needed by the wireless device 30.

The 5G and NR standards specify the time and frequency locations of the SS block. The SS block is not transmitted in every time slot. In time slots where the SS block is transmitted, it may overlap control channel resources that could otherwise be used for transmitting DCI on the PDCCH as seen in FIG. 2. That is, some of the control channel resources used for transmitting DCI to the wireless device 30 on the PDCCH in time slots where the SS block is not present, may be used instead for transmitting the SS block in time slots where the SS block is being transmitted. A time slot in which the SS block is not transmitted may be considered to be in a first state, and a time slot in which the SS block is transmitted may be considered to be in a second state.

A wireless device 30 is typically configured with a control resource set (CORSET) to monitor for downlink control information. The control resource set is part of the PDCCH. The control resource set is configured in or allocated to the wireless device 30, for example, during connection establishment or during a handover from one cell to another. In time slots where the SS block is transmitted, the control resource set assigned to a wireless device 30 may not be available for transmitting downlink control information because those resources are being used to transmit the SS block.

In exemplary embodiments of the present disclosure, the wireless device 30 is configured with or allocated a second control resource set to use in time slots where the SS block is transmitted. The second control resource set is used in addition to the first control resource set. Because the timing of the SS block is known to the wireless device 30, the wireless device 30 is able to determine whether the SS block is present in a particular time slot and select either the first control resource set or the second control resource set to monitor for DCI depending on whether the SS block is present or not.

More generally, the wireless device 30 may determine the state of a time slot and select either a first control resource set or a second control resource set to monitor for DCI depending on the state of the time slot. In the exemplary embodiment described above, the state of the time slot is determined by the presence or absence of the SS block. Those skilled in the art will appreciate, however, that the techniques described herein could be applied to recurring control information other than the SS block. For example, when the base station 20 operates in an unlicensed spectrum, the base station 20 may signal a set of time slots (sometimes called Discovery Signal Measurement Timing Configuration, or DMTC for short) in which synchronization signal blocks may be transmitted. The wireless device 30 may use this information to determine whether a time slot is in a first state or a second state. In some embodiments, the wireless device 30 may consider all slots signaled by the base station 20 to be in the second state, even if the base station 20 only transmits synchronization signals in a subset of the signaled time slots. In this case, the wireless device 30 would monitor the first control resource set in time slots where the synchronization blocks may be transmitted, i.e. the first state, and monitor the second control resource set in time slots where additional SI is transmitted (i.e. the second state).

In another embodiment, the state of the time slot may be determined based on the presence or absence of additional system information transmitted on the PDSCH indicated by the MIB. Time slots where the first control resource set overlaps with additional SI transmitted on the PDSCH may be considered to be in a second state. In this case, the wireless device 30 can monitor the first control resource set in time slots where no additional SI is transmitted, i.e. the first state, and monitor the second control resource set in time slots where additional SI is transmitted, i.e., the second state.

In some embodiment, sidelink device-to-device (D2D) resources transmitted in some time slots may use resources that could otherwise be used for the PDCCH. In this example, the state of the time slot may be determined based on the presence or absence of sidelink D2D resources in the time slot.

Another aspect of the disclosure comprises an efficient method for signaling the first and second control resource sets (or more) to be used by the wireless device 30. Generally, the base station 20 sends one or more resource identifiers to the wireless device to indicate the first control channel resources, the second control channel resources, or both to the wireless device 30.

In one exemplary embodiment, the base station 20 explicitly signals the first control resource set to the wireless device 30. The wireless device 30 then determines the second control resource set based on a pre-determined mapping between the first control resource set and the second control resource set. In some embodiments, the second resource set may be signaled implicitly by providing the wireless device 30 with additional information for mapping between the first control resource set and the second control resource set.

The first control resource set may be signaled in any number of ways. In one embodiment, the base station 20 sends the wireless device 30 a bitmap (i.e., resource identifier) indicating the control channel resources, i.e., resource elements, in the first control resource set. The bitmap comprises a series of bits, each corresponding to a resource element or group of resource elements. A bit may be set to a value of "1" to indicate that a resource element or group of resource elements belongs to the first control resource set, and set to a value of "0" to indicate that the resource element or group of resource elements do not belong to the first control resource set.

In other embodiments, the resource identifier may comprise an indication of a frequency range. The frequency range may be indicated by a first frequency/subcarrier and a last frequency/subcarrier in the range. The first resource set in this case comprises the two frequencies/subcarriers signaled by the base station 20 and all frequencies/subcarriers in between.

In other embodiments, the base station 20 and the resource identifier may comprise an index value that maps to the first control resource set. For example, the wireless device 30 may be configured with two or more possible control resource sets, each of which is identified by an index value. The available control resource sets may be stored in a lookup table along with the corresponding index values. The wireless device 30 may then use the index value received from the base station 20 or cell to lookup the first control resource set in the lookup table.

As noted above, the wireless device 30 may be configured to determine the second control resource set based on a pre-determined mapping between the first control resource set and the second control resource set. The predetermined mapping may be specified by standard, or may be signaled to the wireless device 20, for example, through Layer 1/Layer 2 (L1/L2) signaling, or high layer signaling (e.g., radio resource control (RRC) signaling).

In one embodiment, the wireless device 30 may determine the second control resource set by applying a known frequency offset to the first control resource set. The frequency offset may specify a frequency shift that is applied to all control channel resources in the first control resource set. The frequency offset may be specified by a standard, or signaled to the wireless device 20 by the base station 20 in L1/L2 signaling, or by another network node via RRC signaling.

In some embodiments of the invention, the resource identifiers transmitted by the base station 20 may, in addition to indicating the first control resource set, indicate the second control resource set. For example, the base station 20 may transmit a second bitmap or second frequency range to indicate the second control resource set. An advantage of this approach is that it provides more flexibility to the base station 20 in allocating control channel resources at the expense of higher signaling overhead.

In another embodiment, the wireless device 30 may be configured with two or more control resource set pairs, each of which is assigned an index value. During connection establishment or handover, for example, the base station 30 may transmit an index value to the wireless device 30 indicating a control resource set pair to use for receiving downlink control information. The control resource set pairs may be stored in a lookup table. Upon receipt of the index value from the base station 20, the wireless device 30 may perform a lookup using the received index value to determine the control resource set pair to use for receiving downlink control information. An advantage of this approach is that it requires only a small amount of signaling overhead to signal the control resource set pair.

Figure 3:
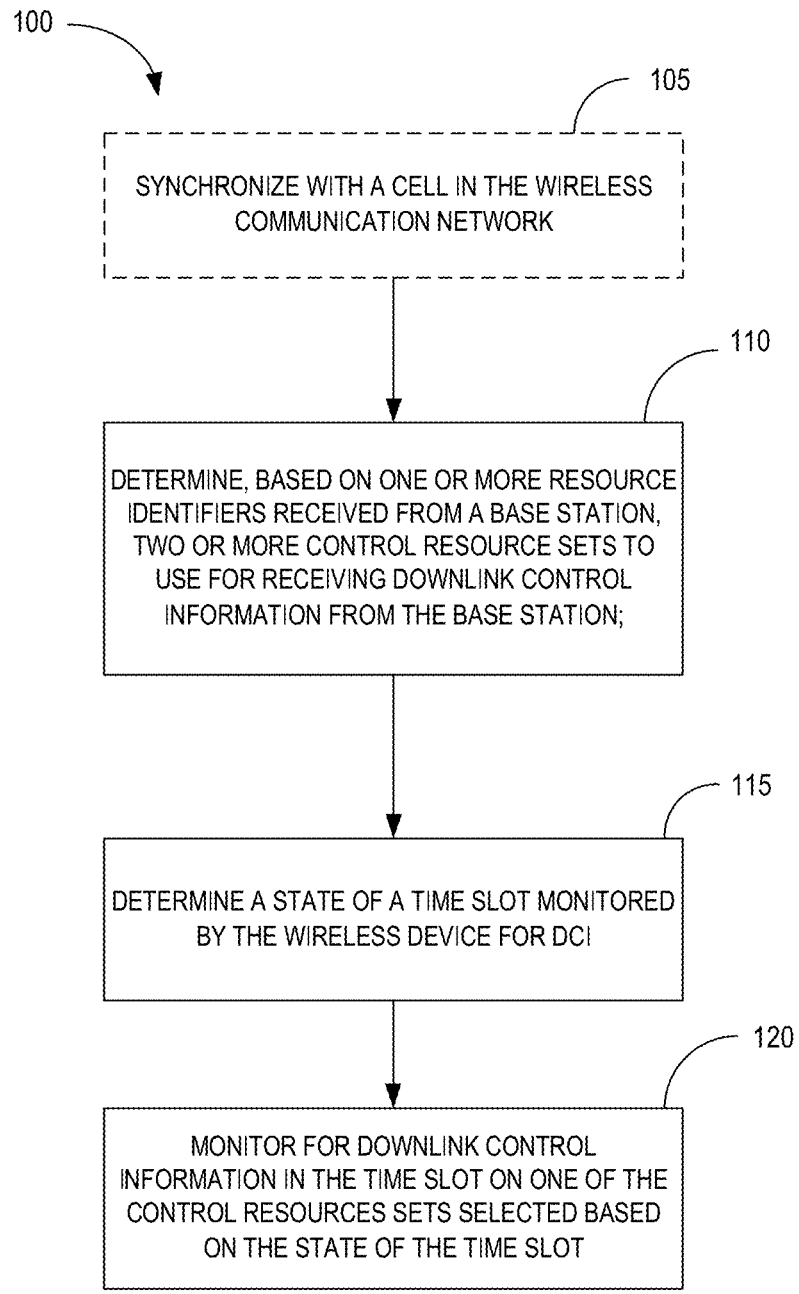
FIG. 3 illustrates an exemplary method implemented by a wireless device in a wireless communication network.

FIG. 3 illustrates an exemplary method 100 implemented by a wireless device 30 in one exemplary embodiment. The wireless device 30 initially synchronizes with a cell in the wireless communication network 10 (block 110). The particular method of synchronizing with a cell is not a material aspect of the disclosure. The wireless device 30 may employ conventional techniques as described above to synchronize with the cell.

After synchronizing with the cell, the wireless device 30 determines, based on one or more resource identifiers received from a base station, two or more control resource sets to use for receiving downlink control information from the base station (block 120). The two or more control resource sets may include a first control resource set for receiving downlink control information in a first set of time slots corresponding to a first state, and a second control resource set for receiving downlink control information in a second set of time slots corresponding to a second state. Once the control resource sets are determined, the wireless device 30 determines a state of a time slot to monitor for DCI (block 130). The wireless device 30 then monitors for downlink control information in the time slot on one of the control resources sets selected based on the state of the time slot (block 140).

In one embodiment, the wireless device 30 will monitor either a first control resource set or a second control resource set in the time slot depending on the state of the first time slot. If the time slot is in a first state, the wireless device 30 monitors the first control resource set for DCI (block 140). If the time slot is in a second state, the wireless device 30 monitors the second control resource set for DCI. The second control resource set may contain fewer resources than the first control resource set with a less robust coding or format. In this case, a different resource mapping may be used for the smaller control resource set.

The method shown in FIG. 3 is easily extended to more than two states. For example, the wireless device 30 may determine, based on the resource identifiers received from the cell, a third set of control resources to use for receiving downlink control information in a third set of slots corresponding to a third state. If the time slot is in a third state, the wireless device 30 receives the downlink control information on the third control resource set. In some embodiments, the second and third control resource sets for the second and third sets of time slots may be same.

In some embodiments, the resource identifiers received from the cell indicate the first control resource set. The resource identifier may comprise a bitmap indicating control channel resources (i.e., resource elements), an indication of a frequency range, or an index value that maps to the first control resource set.

In some embodiments, the wireless device 30 determines the second control resource set by applying a pre-determined mapping between the control channel resources in the first control resource set and the control channel resources in the second control resource set. In one exemplary embodiment, the wireless device 30 determines the second control resource set by applying a known frequency offset to the control channel resources in the first control resource set. The frequency offset may be specified by standard and pre-configured in the wireless device 30, or received by the wireless device 30 via L1/L2 signaling or higher layer signaling.

In some embodiments, the resource identifiers received from the cell may provide an explicit indication of the second control resource set. The second control resource set may be signaled in the same manner as the first control resource set. For example, the second resource set may be indicated by a bitmap indicating control channel resources (i.e., resource elements), by a frequency range, or by an index value that maps to the second resource set.

In some embodiments, the wireless device 20 may receive a single resource identifier, such as an index value, that indicates both the first and second control resource sets. For example, the wireless device 20 may be pre-configured with two or more resource set pairs which are stored in a lookup table, each associated with an index value. When the wireless device 30 receives the index value, the wireless device 30 may perform a lookup to determine the control resource set pair to use for receiving downlink control information. It will be readily apparent to those skilled in the art that the index value could also map to a triplet, or larger group of control resource sets.

In some embodiments, the wireless device 20 determines the state of the time slot based on a timing of downlink transmissions from the base station 20. For example, the wireless device 30 may determine the state of the tie slot based on a known timing of the SS block or other synchronization signals, system information, or a Discovery Signal Measurement Timing Configuration (DMTC).

In some embodiments, the wireless device determines the state of the time slot based on a timing of a window in which the base station can transmit downlink signal. For example, the wireless device 30 may determine the state of the time slot based on the timing of a window in which the base station 20 can transmit synchronization signals, system information, or a Discovery Signal Measurement Timing Configuration (DMTC).

Figure 4:
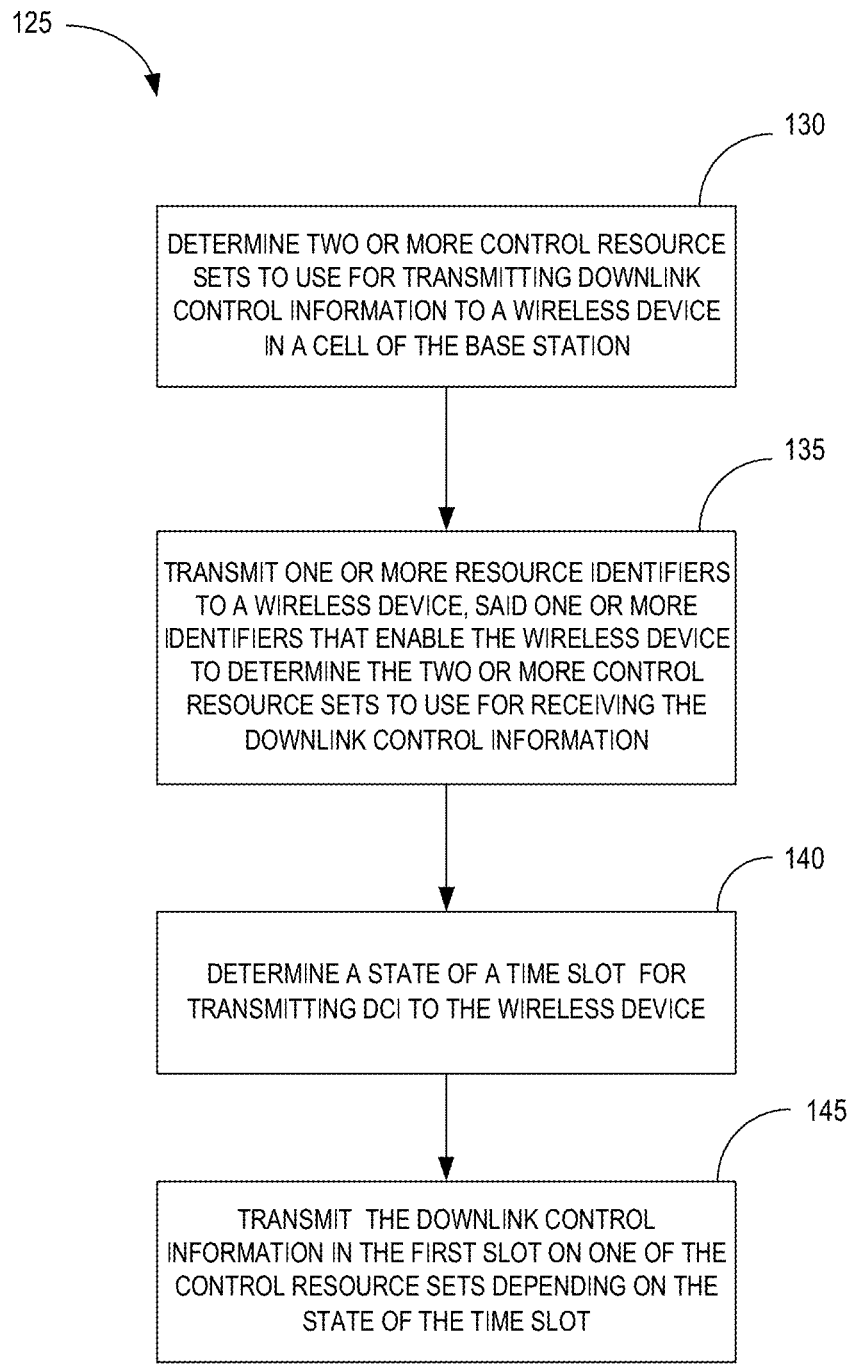
FIG. 4 illustrates an exemplary method implemented by a wireless device in a wireless communication network.

FIG. 4 illustrates an exemplary method 150 implemented by a base station 20 in one exemplary embodiment. The base station 20 two or more control resource sets to use for transmitting downlink control information to a wireless device 30 (block 160). In one embodiment, the two or more control resource sets include a first control resource set is used to transmit downlink control information in a first set of time slots corresponding to a first state, and the second control resource set is used to transmit downlink control information in a second set of time slots corresponding to a second state. Once the control resource sets are determined, the base station 20 transmits one or more resource identifiers to the wireless device 30 that enable the wireless device 30 to determine the two or more control resource sets to use for receiving the downlink control information (block 170). When the base station 20 schedules the wireless device 30 to receive a downlink transmission, the base station determines the state of the slot used for the downlink transmission (block 180). As described above, the base station 20 will transmit downlink control information, e.g., scheduling grant, in the time slot on one of the control resource sets depending on the state of the time slot (block 190).

In one embodiment, the base station 20 will transmit DCI in the time slot on either a first control resource set or a second control resource set depending on the state of the first time slot. If the time slot is in a first state, the base station 20 transmits the DCI on the first control resource. If the time slot is in a second state, the base station 20 transmits the DCI the second control resource set. The second control resource set may contain fewer resources than the first control resource set with a less robust coding or format.

The method shown in FIG. 4 is easily extended to more than two states. For example, the base station 20 may determine a third control resource set to use for transmitting downlink control information in a third set of slots corresponding to a third state. Based on the state of the slot, the base station may transmit downlink control information, e.g., scheduling grant, in selected slot on the first, second or third control resource set depending on the state of the slot (block 190).

In some embodiments, the base station 20 determines the control resource sets based on a control rule. For example, the base station 20 may determine the control resource sets based on one or more of a number of wireless devices camping in a cell served by the base station, a desired bandwidth spread of a control channel, and a level of power consumption.

In some embodiments, the base station 20 determines the control resource sets based on an allowed synchronization frequency for a synchronization signal transmitted by the base station in the second set of time slots.

In some embodiments, the base station 20 determines the control resource sets based on what control channel resources have been allocated for other downlink transmission. For example, the base station 20 may determine the control resource sets based on a previous allocation of control channel resources for transmitting synchronization signals, system information, or the DMTC.

In some embodiments, the resource identifiers transmitted to the wireless device 30 indicate the first control resource set. The resource identifier may comprise a bitmap indicating control channel resources (i.e., resource elements), an indication of a frequency range, or an index value that maps to the first control resource set.

In some embodiments, the base station 20 transmits a frequency to the wireless device 30 that is used by the wireless device to identify the second control resource set. In this embodiment, the wireless device 30 determines the second control resource set by applying a known frequency offset to the control channel resources in the first control resource set.

In some embodiments, the resource identifiers transmitted to the wireless device 30 may provide an explicit indication of the second control resource set. The second control resource set may be signaled in the same manner as the first control resource set. For example, the second resource set may be indicated by a bitmap indicating control channel resources (i.e., resource elements), by a frequency range, or by an index value that maps to the second resource set.

In some embodiments, the base station 20 may transmit a single resource identifier, such as an index value, that indicates both the first and second control resource sets. The wireless device 30 may be pre-configured with two or more resource set pairs which are stored in a lookup table. When the base station 20 transmits the index value, the wireless device 30 may perform a lookup to determine the control resource set pair to use for receiving downlink control information. It will be readily apparent to those skilled in the art that the index value could also map to a triplet, or larger group of control resource sets.

Figure 5:
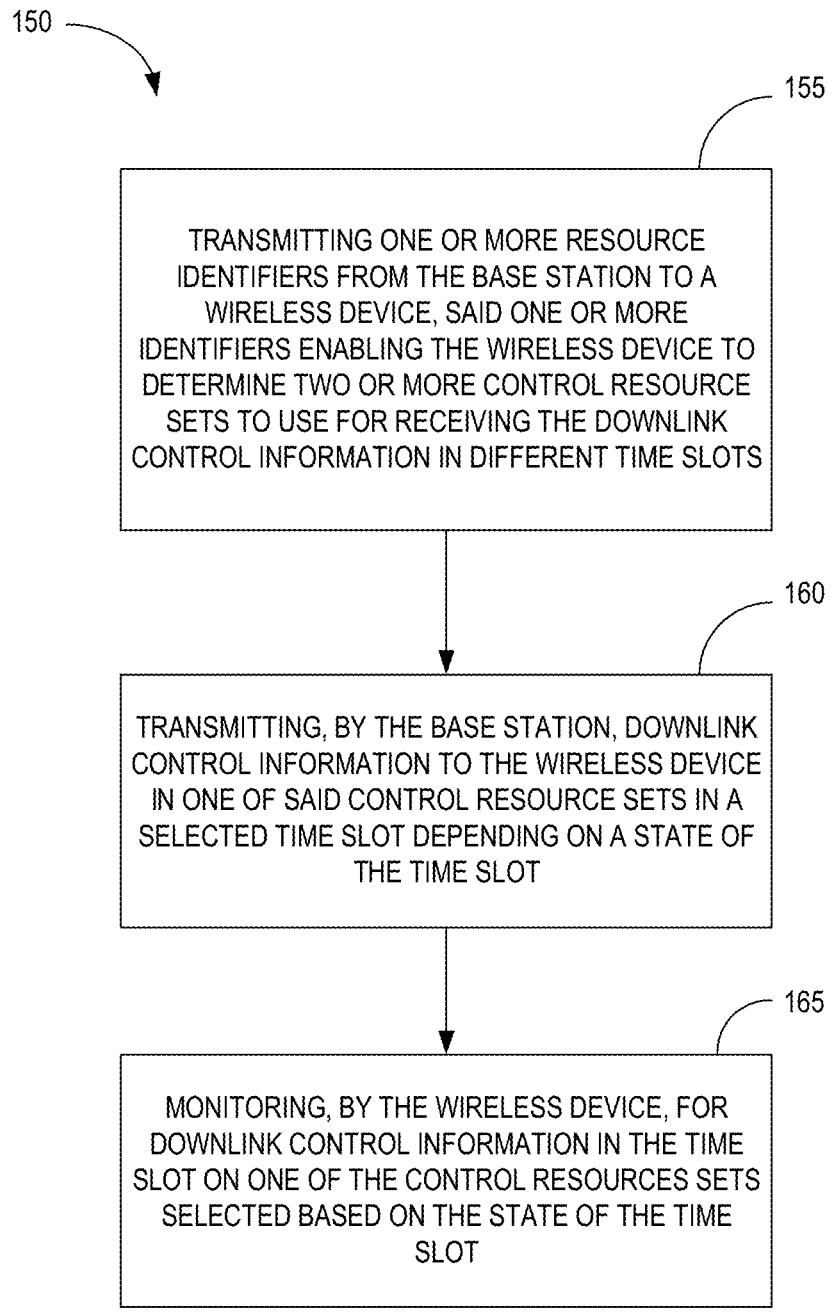
FIG. 5 illustrates a method implemented in a wireless communication network.

FIG. 5 illustrates a method of signaling downlink control information from a base station 20 in a wireless communication network 10 to a wireless device 30 served by the base station 20, the method comprising:

transmitting one or more resource identifiers from the base station (20, 300, 500) to a wireless device (30, 200, 400), said one or more identifiers enabling the wireless device (30, 200, 400) to determine two or more control resource sets to use for receiving the downlink control information in different time slots;

transmitting, by the base station (20, 300, 500), downlink control information to the wireless device (30, 200, 400) in one of said control resource sets in a selected time slot depending on a state of the time slot; and monitoring, by the wireless device (30, 200, 400), for downlink control information in the time slot on one of the control resources sets selected based on the state of the time slot.

Figure 6:
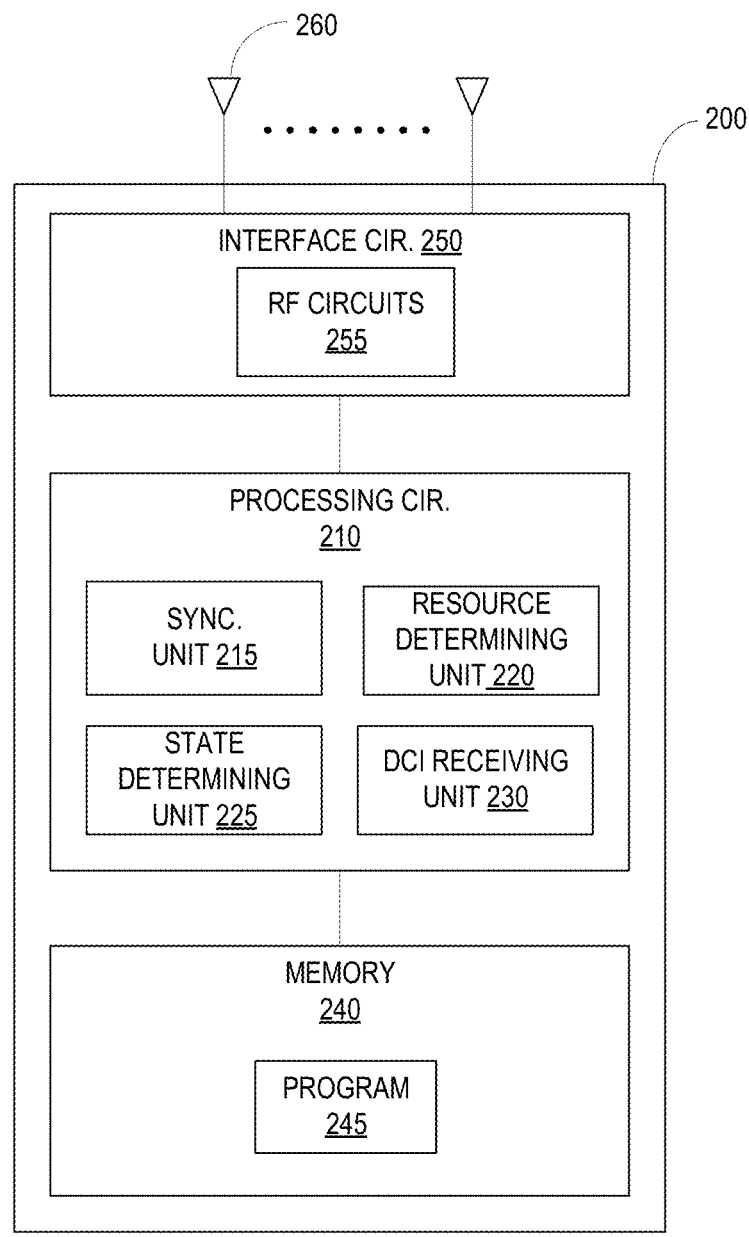
FIG. 6 illustrates an exemplary wireless device configured to perform the methods as herein described.

FIG. 6 illustrates the main functional components of wireless device 200 configured to receive DCI as herein described. The wireless device 200 comprises a processing circuit 210, a memory 240, and an interface circuit 250. The processing circuit 210 is configured to synchronize with a cell in the wireless communication network 10 and determine, based on one or more resource identifiers received from a base station, two or more control resource sets to use for receiving downlink control information from the base station. The processing circuit 210 is further configured to determine a state of a time slot monitored by the wireless device 200 for downlink control information, and monitor for downlink control information in the time slot on one of the control resources sets selected based on the state of the time slot.

The interface circuit 250 includes a radio frequency (RF) circuit 255 coupled to one or more antennas 260. The RF circuit 255 comprises the radio frequency (RF) components needed for communicating with base stations 20 over a wireless communication channel. Typically, the RF components include a transmitter and receiver adapted for communications according to the 5G or NR standards, or other Radio Access Technology (RAT).

The processing circuit 210 processes the signals transmitted to or received by the wireless device 200 and controls the operation of the wireless device 200. Such processing includes coding and modulation of transmitted signals, and the demodulation and decoding of received signals. The processing circuit 210 may comprise one or more microprocessors, hardware, firmware, or a combination thereof. In one embodiment, the processing circuit 210 may include a synchronization unit 215 to synchronize with a cell, a resource determining unit 220 to identify the first and second control resource sets as herein described, a state determining unit 225 to determine the state of a time slot, and a DCI receiving unit 230 to select one of the control resource sets and receive DCI transmitted on the PDCCH. The processing circuit 210 is configured to perform the methods and procedures as herein described.

Memory 240 comprises both volatile and non-volatile memory for storing computer program code and data needed by the processing circuit 210 for operation. Memory 240 may comprise any tangible, non-transitory computer-readable storage medium for storing data including electronic, magnetic, optical, electromagnetic, or semiconductor data storage. Memory 240 stores a computer program 245 comprising executable instructions that configure the processing circuit 210 to implement the methods and procedures described herein including methods shown in FIG. 3. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, the computer program 245 for configuring the processing circuit 210 may be stored in a removable memory, such as a portable compact disc, portable digital video disc, or other removable media. The computer program 245 may also be embodied in a carrier such as an electronic signal, optical signal, radio signal, or computer readable storage medium.

Figure 7:
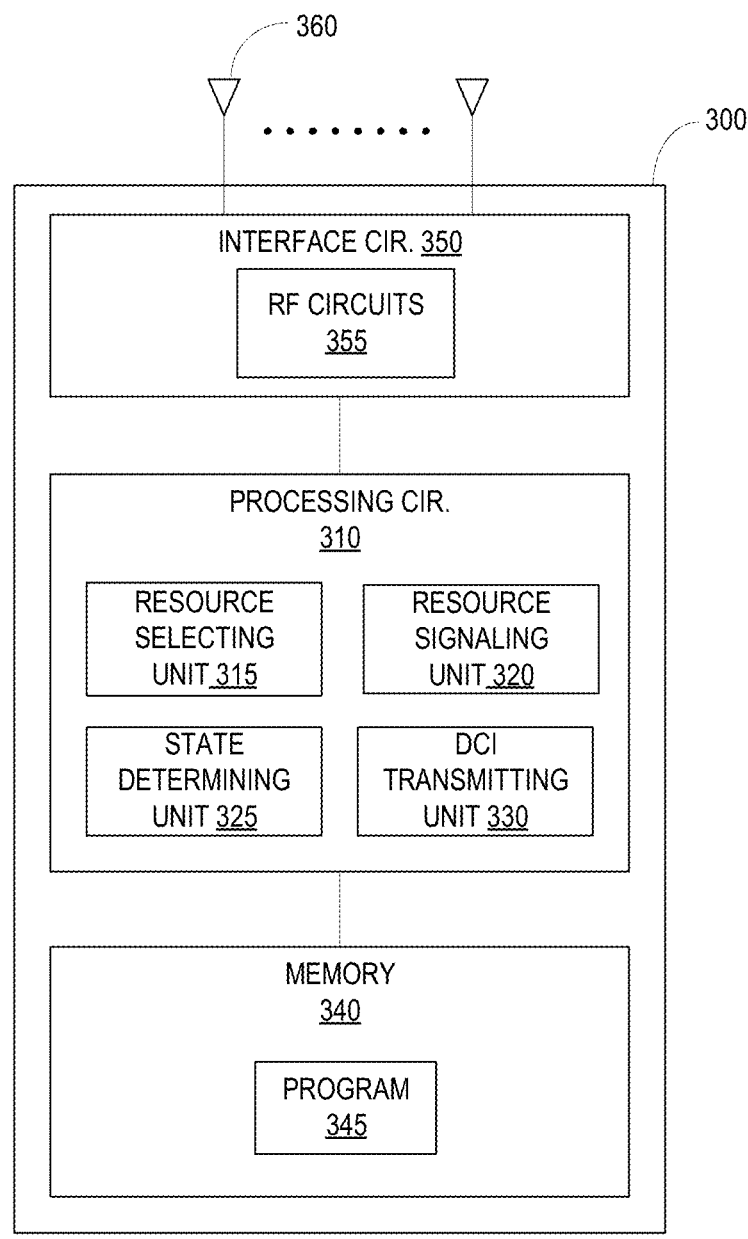
FIG. 7 illustrates an exemplary base station configured to perform the methods as herein described.

FIG. 7 illustrates the main functional components of base station 300 configured to receive DCI as herein described. The base station 300 comprises a processing circuit 310, a memory 340, and an interface circuit 350. The processing circuit 310 is configured to transmit one or more resource identifiers to a wireless device. The one or more identifiers enable the wireless device 30 to determine the two or more control resource sets to use for receiving the downlink control information. The processing circuit 310 is further configured to determine a state of a time slot for transmitting downlink control information to the wireless device 30, and transmit the downlink control information in the time slot on one of the control resource sets depending on the state of the time slot.

The interface circuit 350 includes a radio frequency (RF) circuit 355 coupled to one or more antennas 360. The RF circuit 355 comprises the radio frequency (RF) components needed for communicating with wireless devices 30 over a wireless communication channel. Typically, the RF components include a transmitter and receiver adapted for communications according to the 5G or NR standards, or other Radio Access Technology (RAT).

The processing circuit 310 processes the signals transmitted to or received by the base station 300 and controls the operation of the base station 300. Such processing includes coding and modulation of transmitted signals, and the demodulation and decoding of received signals. The processing circuit 310 may comprise one or more microprocessors, hardware, firmware, or a combination thereof. In one embodiment, the processing circuit 310 may include a resource determining unit 315 to determine the control resource sets for a wireless device 30, a resource signaling unit 320 to signal the resource selection the first and second control resource sets as herein described, a state determining unit 325 to determine the state of a time slot, and a DCI transmitting unit 330 to select one of the control resource sets for transmitting DCI on the PDCCH. The processing circuit 310 is configured to perform the methods and procedures as herein described.

Memory 340 comprises both volatile and non-volatile memory for storing computer program code and data needed by the processing circuit 310 for operation. Memory 340 may comprise any tangible, non-transitory computer-readable storage medium for storing data including electronic, magnetic, optical, electromagnetic, or semiconductor data storage. Memory 340 stores a computer program 345 comprising executable instructions that configure the processing circuit 310 to implement the methods and procedures described herein including methods shown in FIG. 4. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, the computer program 345 for configuring the processing circuit 310 may be stored in a removable memory, such as a portable compact disc, portable digital video disc, or other removable media. The computer program 345 may also be embodied in a carrier such as an electronic signal, optical signal, radio signal, or computer readable storage medium.

Figure 8:
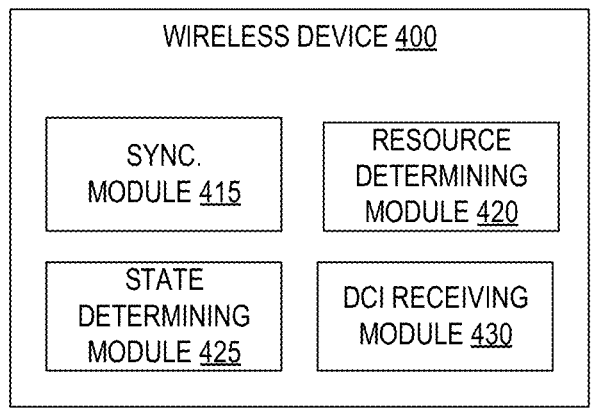
FIG. 8 illustrates another embodiment of a wireless device in a wireless communication network.

FIG. 8 illustrates another embodiment of a wireless device denoted generally by the numeral 400. The wireless device 400 is configured to perform the methods 100 and 150 described above and shown in FIGS. 3 and 5. The wireless device 400 comprises a synchronization unit/module 410, a resource determining unit/module 420, and a state determining unit/module 430. In some embodiments, the wireless device 400 further includes a DCI receiving unit/module 440. The various units/modules 410, 420, 430 and 440 can be implemented by processing circuitry and/or by software code that is executed by a processor or processing circuit. The synchronization unit/module 410 is configured to synchronize with a cell in the wireless communication network. The resource determining unit/module 420 is configured to determine, based on one or more resource identifiers received from a base station, two or more control resource sets to use for receiving downlink control information from the base station. The state determining unit/module 430 is configured to determine a state of a time slot monitored by the wireless device 400 for downlink control information. The DCI receiving unit/module 440, if present, is configured to monitor for downlink control information in the time slot on one of the control resources sets selected based on the state of the time slot. In some embodiments.

Figure 9:
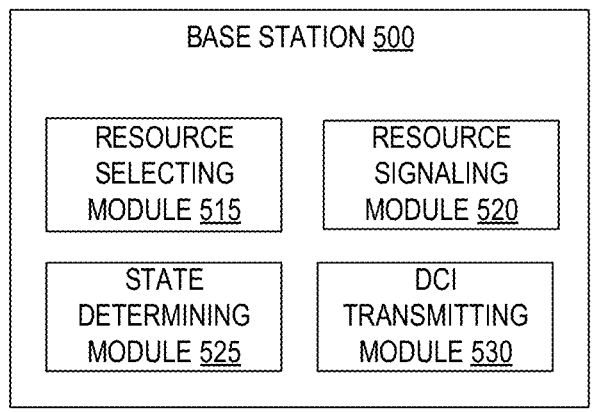
FIG. 9 illustrates another embodiment of a base stations in a wireless communication network.

FIG. 9 illustrates another embodiment of a base station denoted generally by the numeral 500. The base station 500 is configured to perform the methods 125 and 150 described above and shown in FIGS. 4 and 5. The base station 500 comprises a resource selecting unit/module 510, a resource signaling unit/module 520, a state determining unit/module 530 and a DCI transmitting unit/module 540. The various units/modules 510, 520, 530 and 540 can be implemented by processing circuitry and/or by software code that is executed by a processor or processing circuit. The resource selecting unit/module 510 is configured to determine two or more control resource sets to use for transmitting downlink control information to a wireless device in a cell of the base station. The resource signaling unit/module 520 is configured to transmit one or more resource identifiers to a wireless device. The one or more identifiers enable the wireless device to determine the two or more control resource sets to use for receiving the downlink control information. The state determining unit/module 530 is configured to determine a state of a time slot for transmitting downlink control information to the wireless device. The DCI transmitting unit/module 540 is configured to transmit the downlink control information in the time slot on one of the control resource sets depending on the state of the time slot.

Using methods and apparatus as herein described, the signaling of the control resource set to be monitored by the wireless device can be made efficient with fewer bits to transmit. Once the control resource set is signaled for a first slot state, a map (for instance defined by standard) may be used to determine the control resource sets to monitor in the other slot states. Thus, there is no need to explicitly signal the control resource set (which typically is a bitmap) for all states.

What is claimed is:

1. A method, implemented by a wireless device in a wireless communication network, of receiving downlink control information, the method comprising the wireless device:
determining, based on one or more resource identifiers received from a base station, two or more control resource sets to use for receiving downlink control information from the base station, wherein the two or more control resource sets include a first control resource set in a first set of time slots corresponding to a first state, and a second control resource set in a second set of time slots corresponding to a second state, wherein time slots in the second set of time slots is used for transmitting at least one of a synchronization signal that overlaps with the first control resource set, a synchronization signal block that overlaps with the first control resource set, and system information that overlaps with the first control resource set;
determining a state of a time slot monitored by the wireless device for downlink control information based on expected transmissions of synchronization signals or reference signals during the time slot using resources of one of the control resource sets, comprising at least one of determining whether a synchronization signal is transmitted in the time slot, a synchronization signal block is transmitted in the time slot, and system information is transmitted in the time slot; and
monitoring for downlink control information in the time slot on one of the control resources sets selected based on the state of the time slot.

2. The method of claim 1, wherein the second control resource set contains fewer resources than the first control resource set with less robust coding or formatting.

3. The method of claim 1, wherein the two or more control resource sets further include a third control resource set for receiving downlink control information in a third set of time slots corresponding to a third state.

4. The method of claim 1, wherein the one or more resource identifiers comprise at least one of:
a first frequency range for the first control resource set;
a first bitmap identifying the first control resource set; and
a first index value associated with the first resource control set.

5. The method of claim 1, wherein determining the second control resource set comprises applying a predetermined mapping between control resources in the first control resource set and control channel resources in the second control resource set.

6. The method of claim 1, wherein the one or more resource identifiers comprises a frequency offset; and
wherein determining the second control resource set is determined based on the frequency offset and the first control resource set.

7. The method of claim 1, wherein the one or more resource identifiers comprises at least one of:
a second frequency range for the second control resource set;
a second bitmap identifying the second control resource set, and wherein the second control resource set is determined based on the second bitmap; and
a second index value; and
wherein the second control resource set is determined based on the second index value.

8. The method of claim 1, wherein the one or more resource identifiers comprise a single index value associated with a control resource set pair; and
wherein the first and second control resource sets are determined based on the single index value.

9. The method of claim 1, further comprising receiving downlink control information in the time slot on the selected one of the two or more control resource sets.

10. The method of claim 1, wherein the determining the state of a time slot monitored by the wireless device comprises determining whether the time slot falls within the window in which the cell is allowed to transmit at least one of synchronization signals, a synchronization signal block, or system information.

11. The method of claim 10, wherein the window comprises a Discovery Signal Measurement Timing Configuration (DMTC).

12. A wireless device in a wireless communication network, the wireless device comprising:
processing circuitry;
memory containing instructions executable by the processing circuitry whereby the wireless device is operative to:
synchronize with a cell in the wireless communication network;
determine, based on one or more resource identifiers received from the cell, two or more control resource sets to use for receiving downlink control information from a base station, wherein the two or more control resource sets include a first control resource set in a first set of time slots corresponding to a first state, and a second control resource set in a second set of time slots corresponding to a second state, wherein time slots in the second set of time slots is used for transmitting at least one of a synchronization signal that overlaps with the first control resource set, a synchronization signal block that overlaps with the first control resource set, and system information that overlaps with the first control resource set;
determine a state of a time slot based on expected transmissions of synchronization signals or reference signals during the time slot using resources of one of the control resource sets, comprising at least one of determining whether a synchronization signal is transmitted in the time slot, a synchronization signal block is transmitted in the time slot, and system information is transmitted in the time slot; and
monitor for downlink control information in the time slot on one of the control resources sets selected based on the state of the time slot.

13. A non-transitory computer readable recording medium storing a computer program product for controlling a wireless device in a wireless communication network for receiving downlink control information, the computer program product comprising software instructions which, when run on processing circuitry of the wireless device, causes the wireless device to:
determine, based on one or more resource identifiers received from a base station, two or more control resource sets to use for receiving downlink control information from the base station, wherein the two or more control resource sets include a first control resource set in a first set of time slots corresponding to a first state, and a second control resource set in a second set of time slots corresponding to a second state, wherein time slots in the second set of time slots is used for transmitting at least one of a synchronization signal that overlaps with the first control resource set, a synchronization signal block that overlaps with the first control resource set, and system information that overlaps with the first control resource set;
determine a state of a time slot monitored by the wireless device for downlink control information based on expected transmissions of synchronization signals or reference signals during the time slot using resources of one of the control resource sets, comprising at least one of determining whether a synchronization signal is transmitted in the time slot, a synchronization signal block is transmitted in the time slot, and system information is transmitted in the time slot; and
monitor for downlink control information in the time slot on one of the control resources sets selected based on the state of the time slot.

14. A method, implemented by a base station in a wireless communication network, of transmitting downlink control information, the method comprising the base station:
determining two or more control resource sets to use for transmitting downlink control information to a wireless device, wherein the two or more control resource sets include a first control resource set in a first set of time slots corresponding to a first state, and a second control resource set in a second set of time slots corresponding to a second state, wherein time slots in the second set of time slots is used for transmitting at least one of a synchronization signal that overlaps with the first control resource set, a synchronization signal block that overlaps with the first control resource set, and system information that overlaps with the first control resource set;
transmitting one or more resource identifiers to a wireless device, the one or more identifiers enabling the wireless device to determine the two or more control resource sets to use for receiving the downlink control information;
determining a state of a time slot for transmitting downlink control information to the wireless device based on expected transmissions of synchronization signals or reference signals during the time slot using resources of one of the control resource sets, comprising at least one of determining whether a synchronization signal is transmitted in the time slot, a synchronization signal block is transmitted in the time slot, and system information is transmitted in the time slot; and
transmitting the downlink control information in the time slot on one of the control resource sets depending on the state of the time slot.

15. The method of claim 14, wherein the two or more control resource sets include a first control resource set for transmitting downlink control information in a first set of time slots corresponding to a first state, and a second control resource set for transmitting downlink control information in a second set of time slots corresponding to a second state.

16. The method of claim 15, wherein the second control resource set contains fewer resources than the first control resource set with less robust coding or formatting.

17. The method of claim 15, wherein the two or more control resource sets further include a third control resource set for transmitting downlink control information in a third set of time slots corresponding to a third state.

18. The method of claim 15, wherein the first and second control resource sets are determined based on at least one of:
a number of wireless devices in a cell served by the base station;
a desired bandwidth spread of a control channel; and
a level of power consumption.

19. The method of claim 14, further comprising the base station:
determining an allowed synchronization frequency for a synchronization signal transmitted by the base station in the second set of time slots; and
determining the second control resource set based on the allowed synchronization frequency.

20. The method of claim 14, further comprising the base station:
allocating control channel resources for a downlink transmission, in the second set of time slots, of at least one of system information, synchronization signals, and a Discovery Signal Measurement Timing Configuration (DMTC); and
determining the second control resource set based on the control channel resources allocated for transmitting the system information, synchronization signals, Discovery Signal Measurement Timing Configuration (DMTC) or any combination thereof.

21. The method of claim 14, wherein the one or more resource identifiers comprise at least one of:
a first frequency range for the first control resource set;
a first bitmap identifying the first control resource set; and
a first index value associated with the first control resource set.

22. The method of claim 14, wherein the one or more resource identifiers comprises a frequency offset used by the wireless device to determine the second control resource set.

23. The method of claim 14, wherein the one or more resource identifiers comprises at least one of:
a second frequency range for the second control resource set;
a second bitmap identifying the second control resource set;
a second index value associated with the second control resource set.

24. The method of claim 14, wherein the one or more resource identifiers comprises a single index associated with a control resource set pair.

25. The method of claim 15:
wherein the second set of time slots comprises time slots used for transmitting signals that overlap with the first control resource set;
wherein the signals comprise at least one of:
a synchronization signal block that overlaps with the first control resource set;
system information that overlaps with the first control resource set; and
a Discovery Signal Measurement Timing Configuration (DMTC) that overlaps with the first control resource set.

26. The method of claim 14, wherein the determining the state of the time slot for transmitting downlink control information to the wireless device comprises determining the state of the time slot based on whether at least one of a synchronization signal, a synchronization signal block, and system information is transmitted in the time slot.

27. The method of claim 14, wherein the determining the state of the time slot for transmitting downlink control information to the wireless device comprises determining if the time slot falls within a window where the base station is allowed to transmit at least one of a synchronization signal, system information, and a Discovery Signal Measurement Timing Configuration (DMTC).

28. A base station in a wireless communication network, the base station comprising:
   processing circuitry;
   memory containing instructions executable by the processing circuitry whereby the base station is operative to:
      determine two or more control resource sets to use for transmitting downlink control information to a wireless device in a cell of the base station, wherein the two or more control resource sets include a first control resource set in a first set of time slots corresponding to a first state, and a second control resource set in a second set of time slots corresponding to a second state, wherein time slots in the second set of time slots is used for transmitting at least one of a synchronization signal that overlaps with the first control resource set, a synchronization signal block that overlaps with the first control resource set, and system information that overlaps with the first control resource set;
      transmit one or more resource identifiers to a wireless device, the one or more identifiers enabling the wireless device to determine the two or more control resource sets to use for receiving the downlink control information;
      determine a state of a time slot for transmitting downlink control information to the wireless device based on expected transmissions of synchronization signals or reference signals during the time slot using resources of one of the control resource sets, comprising at least one of determining whether a synchronization signal is transmitted in the time slot, a synchronization signal block is transmitted in the time slot, and system information is transmitted in the time slot; and
      transmit the downlink control information in the time slot on one of the control resource sets depending on the state of the time slot.

29. A non-transitory computer readable recording medium storing a computer program product for controlling a base station in a wireless communication network for of transmitting downlink control information, the computer program product comprising software instructions which, when run on processing circuitry of the base station, causes the base station to:
   determine two or more control resource sets to use for transmitting downlink control information to a wireless device, wherein the two or more control resource sets include a first control resource set in a first set of time slots corresponding to a first state, and a second control resource set in a second set of time slots corresponding to a second state, wherein time slots in the second set of time slots is used for transmitting at least one of a synchronization signal that overlaps with the first control resource set, a synchronization signal block that overlaps with the first control resource set, and system information that overlaps with the first control resource set;
   transmit one or more resource identifiers to a wireless device, the one or more identifiers enabling the wireless device to determine the two or more control resource sets to use for receiving the downlink control information;
   determine a state of a time slot for transmitting downlink control information to the wireless device based on expected transmissions of synchronization signals or reference signals during the time slot using resources of one of the control resource sets, comprising at least one of determining whether a synchronization signal is transmitted in the time slot, a synchronization signal block is transmitted in the time slot, and system information is transmitted in the time slot; and
   transmit the downlink control information in the time slot on one of the control resource sets depending on the state of the time slot.

* * * * *